(12) United States Patent
Renault

(10) Patent No.: US 6,526,643 B1
(45) Date of Patent: Mar. 4, 2003

(54) METHOD FOR MANAGING THE OPERATION OF A SEAT AND SEAT IMPLEMENTING THIS METHOD

(75) Inventor: Guy Renault, Epinay sur Seine (FR)

(73) Assignee: Labinal, Montigny le Bretonneux (FR)

( * ) Notice: Subject to any disclaimer, the term of this patent is extended or adjusted under 35 U.S.C. 154(b) by 0 days.

(21) Appl. No.: 09/815,044

(22) Filed: Mar. 23, 2001

(30) Foreign Application Priority Data

Mar. 24, 2000 (FR) .............................................. 00 03810

(51) Int. Cl.$^7$ .............................................. B23Q 17/00
(52) U.S. Cl. .............................. 29/407.05; 297/423.26; 297/69
(58) Field of Search .............................. 297/69, 423.19, 297/423.26, 217.2; 29/407.05, 407.08, 407.01

(56) References Cited

U.S. PATENT DOCUMENTS

| | | | |
|---|---|---|---|
| 4,410,215 A | * | 10/1983 | McKean et al. |
| 4,669,780 A | | 6/1987 | Sakakibara et al. |
| 4,696,512 A | * | 9/1987 | Burnett et al. |
| 4,802,706 A | | 2/1989 | Onimaru et al. |
| 5,254,924 A | | 10/1993 | Ogasawara |
| 5,352,020 A | * | 10/1994 | Wade et al. |
| 5,507,562 A | * | 4/1996 | Wieland |
| 5,779,316 A | * | 7/1998 | Sugawa et al. |
| 6,059,364 A | * | 5/2000 | Dryburgh et al. |
| 6,095,610 A | * | 8/2000 | Okajima et al. |
| 6,287,445 B1 | * | 7/2001 | Marais |

FOREIGN PATENT DOCUMENTS

| | | |
|---|---|---|
| FR | 2 740 744 | 5/1997 |
| FR | 2 748 240 | 11/1997 |

* cited by examiner

*Primary Examiner*—David P. Bryant
(74) *Attorney, Agent, or Firm*—Larso & Taylor, PLC

(57) ABSTRACT

A method is provided for managing the operation of a seat equipped with an actuator system including an arrangement for tracking a variable characteristic of the force generated by an actuator and a unit for controlling the actuator in two opposite directions. The method provides for measurement of the characteristic variable, evaluation of the characteristic variable on the basis of at least one predetermined evaluation criterion, and implementation of a suitable adjustment of the seat as a function of the result of the evaluation. The evaluation step includes applying a first evaluation criterion of the characteristic variable measured when the actuator is controlled in the first direction and applying a second evaluation criterion of the characteristic variable measured when the actuator is controlled in the second direction, the first and second evaluation criteria being different.

5 Claims, 2 Drawing Sheets

METHOD FOR MANAGING THE OPERATION OF A SEAT AND SEAT IMPLEMENTING THIS METHOD

The present invention relates to a method for managing the operation of a seat equipped with at least one actuator, comprising means for tracking at least one variable characteristic of the force generated by the actuator and means for controlling the actuator in a first and second direction, the method comprising steps involving:
- a measurement of the or each characteristic variable;
- an evaluation of the or each characteristic variable on the basis of at least one predetermined evaluation criterion; and
- the implementation of a suitable measurement on the seat as a function of the result of said evaluation.

In passenger transport vehicles, such as aircraft and trains, it is known to provide seats equipped with electrical actuators. Each seat generally comprises a leg-rest and a back which are displaceable relative to a sitting surface. Said leg-rest and said back are each articulated on one end of the sitting surface and are each associated with an electrical actuator making it possible for them to be displaced.

In order to prevent the moving leg-rest or back from injuring a passenger or else from damaging luggage interposed in the displacement path of the movable element, it is known to measure continuously the intensity of the current consumed by each actuator. If the intensity of the consumed current exceeds a predetermined threshold value, the actuator is stopped immediately.

To be precise, when the seat element controlled by the actuator encounters an obstacle, this element is immobilized. The electric motor of the actuator controlling it is then blocked, so that the intensity of the current consumed by this motor increases to a very great extent. Stopping the actuator when a high-intensity current passing through the motor is detected prevents the seat or the obstacle which it encounters from being harmed.

In order to avoid inopportune stops of the actuators of the seat, the intensity thresholds causing the stop are fixed at a relatively high value. Thus, in some circumstances, the protection afforded by setting a current intensity threshold may be insufficient to protect effectively a luggage item, the limb of a passenger and the seat itself.

The object of the invention is to propose a method for managing the operation of a seat, which further reduces the risks of injuries to a passenger and increases the useful life of the seat.

For this purpose, the subject of the invention is a method for managing the operation of a seat of the abovementioned type, characterized in that said evaluation comprises:
- a step for applying a first evaluation criterion of the or each characteristic variable measured when the actuator is controlled in the first direction; and
- a step for applying a second evaluation criterion of the or each characteristic variable measured when the actuator is controlled in the second direction, the second evaluation criterion being different from the first evaluation criterion.

According to particular embodiments, the method comprises one or more of the following characteristics:
- said suitable measurement is the control of the actuator in the opposite direction;
- at least one variable characteristic of the force generated by an actuator is a variable characteristic of the electrical current consumed by this actuator;
- said characteristic variable is the intensity consumed by the actuator, and the first and second predetermined evaluation criteria comprise comparisons of the intensity consumed with separate predetermined thresholds; and
- said characteristic variable is the derivative with respect to time of the intensity consumed by the actuator, and the first and second predetermined evaluation criteria comprise comparisons of the derivative with respect to time of the intensity consumed with separate predetermined thresholds.

The subject of the invention is, furthermore, a vehicle seat of the type comprising a back, a sitting surface and a leg-rest, at least one of the back and of the leg-rest being articulated on the sitting surface, the seat comprising at least one actuator for displacing one or each of the back and of the leg-rest in two opposite directions, means for tracking at least one variable characteristic of the force generated by the actuator, means for evaluating the or each characteristic variable on the basis of at least one predetermined evaluation criterion, and means for implementing a suitable measurement on the seat as a function of the result of said evaluation. It comprises a unit for managing the operation of the seat, comprising:
- means for applying a first evaluation criterion of the or each characteristic variable measured when the actuator (24) is controlled in the first direction; and
- means for applying a second evaluation criterion of the or each characteristic variable measured when the actuator (24) is controlled in the second direction, the second evaluation criterion being different from the first evaluation criterion.

The invention will be understood better from a reading of the following description given purely by way of example and made with reference to the drawings in which.

Figure 1:
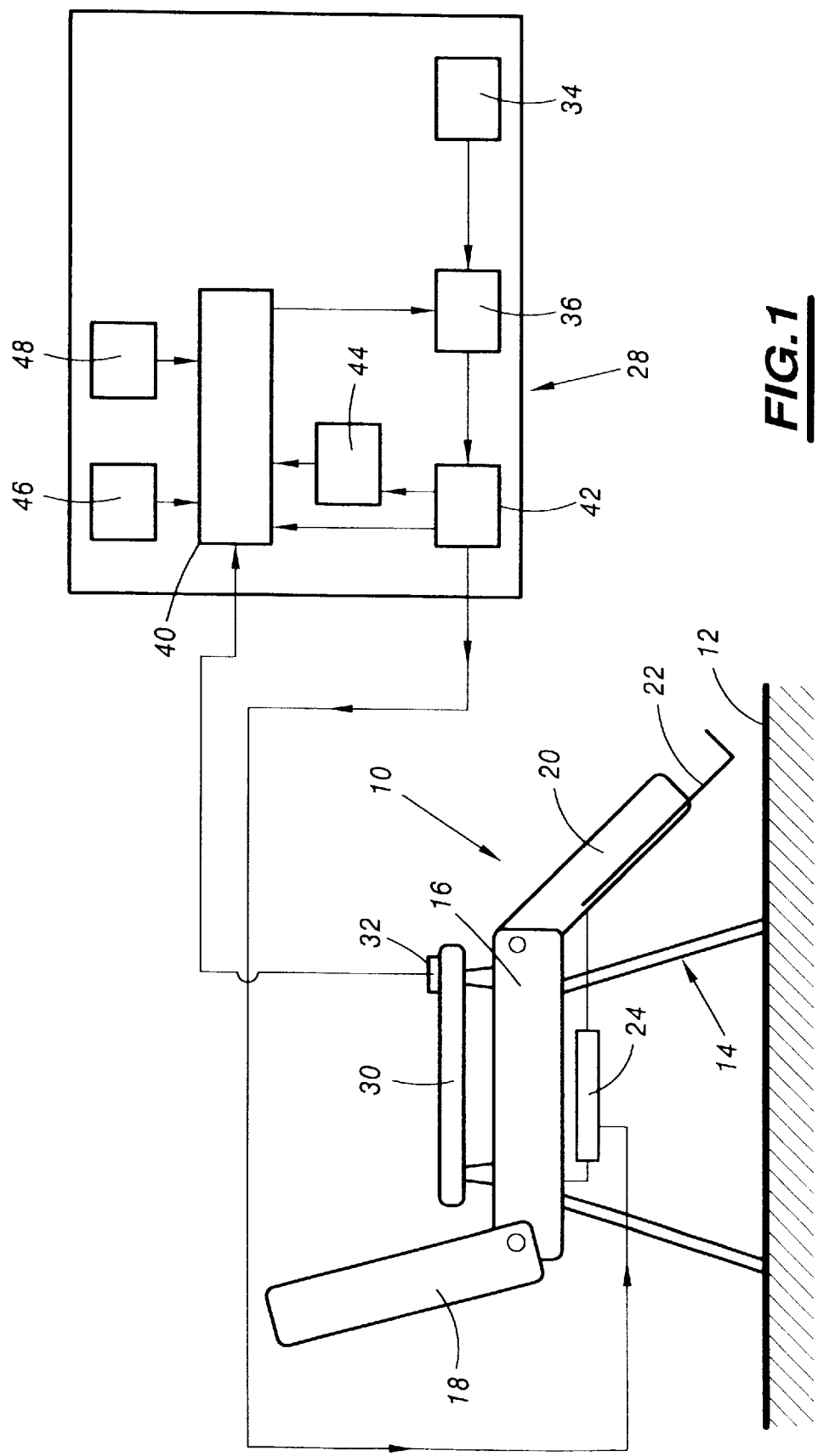
FIG. 1 is a diagrammatic view of a vehicle seat according to the invention.

The seat 10 illustrated in FIG. 1 is a passenger seat of an aircraft. This seat is fastened to the floor 12 of the aircraft.

It comprises a mounting 14 which is fixed to the floor 12 and on which a substantially horizontal sitting surface 16 rests. A back 18 is articulated at one end of the sitting surface. At the other end of the sitting surface 16 is articulated a leg-rest 20 displaceable between a substantially vertical turned-down position below the sitting surface 16 and a substantially horizontal extended position in the prolongation of the sitting surface 16.

The seat 10 comprises, furthermore, a footrest 22 mounted so as to be slideably displaceable relative to the leg-rest 20 in the prolongation of the latter.

The footrest 22 is displaceable between a position retracted within the leg-rest 20 and an extended position in which it prolongs the latter and emerges virtually completely.

An electrical actuator 24 is mounted between the sitting surface 16 and the leg-rest 20, in order to ensure a displacement of the latter between its turned-down position and its extended position.

The actuator 24 is fed with electrical current from a unit 28 for managing the operation of the seat.

Furthermore, the seat comprises an armrest 30, on which is fastened a control keypad 32 making it possible to control the actuator 24 in order to cause a displacement of the leg-rest.

The control keypad 32 is connected to the unit 28 for managing the operation of the seat.

The unit 28 comprises a source 34 for supplying the actuator. Said source is formed, for example, from a transformer connected to the general electrical supply network of the aircraft by suitable connection means.

Furthermore, a supply interface 36 ensuring the supply of the actuator 24 is provided at the outlet of the supply source 34. This interface ensures that the supply current of the actuator is shaped as a function of the desired actuation direction and of the desired displacement speed.

The supply interface 36 is controlled by a central information processing unit 40. This unit 40 is connected to the control keypad 32 in order to gather the user's control commands.

The unit 40 uses a suitable actuator control program in which is provided a special management routine which will be explained in the rest of the description with regard to FIG. 2.

Between the supply interface 36 and the actuator 24 are arranged means 42 intended for tracking a variable characteristic of the electrical current consumed by the actuator 24 while it is in operation.

The tracking means 42 are connected to the central information processing unit 40.

The tracking means 42 are designed to determine the instantaneous intensity i of the current consumed by the actuator 24 during an operating phase of the latter.

The central management unit 28 comprises, furthermore, derivation means 44, the input of which is connected to the tracking means 42 and the output of which is connected to the central information processing unit 40. These derivation means are designed to supply at the output the derivative with respect to time, designated $$\frac{di}{dt},$$

of the instantaneous intensity i.

Thus, the central information processing unit 40 continuously receives both the value i of the intensity of the current consumed by the actuator 24 and the value $$\frac{di}{dt}$$

of the derivative with respect to time of the intensity of the current consumed.

Furthermore, storage means 46 and 48 are connected to the central information processing unit 40. Each of these storage means stores a pair of predetermined threshold values respectively designated ($I_1$, $D_1$) and ($I_2$ and $D_2$).

These pairs of threshold values correspond to stopping thresholds of the actuator 24, with which are compared the values of the intensity i and of its derivative with respect to time $$\frac{di}{dt}.$$

The thresholds ($I_1$, $D_1$) are used when the leg-rest is brought towards its retracted position, whilst the thresholds ($I_2$ and $D_2$) are used when this leg-rest is brought towards its extended position.

For the seat to operate, the central information processing unit 40 uses a program known per se, designed to control the supply interface 36 so that the latter ensures that the actuator 24 is supplied in one direction or the other, by reversal of the current direction, as a function of the information received from the keypad 32.

Figure 2:
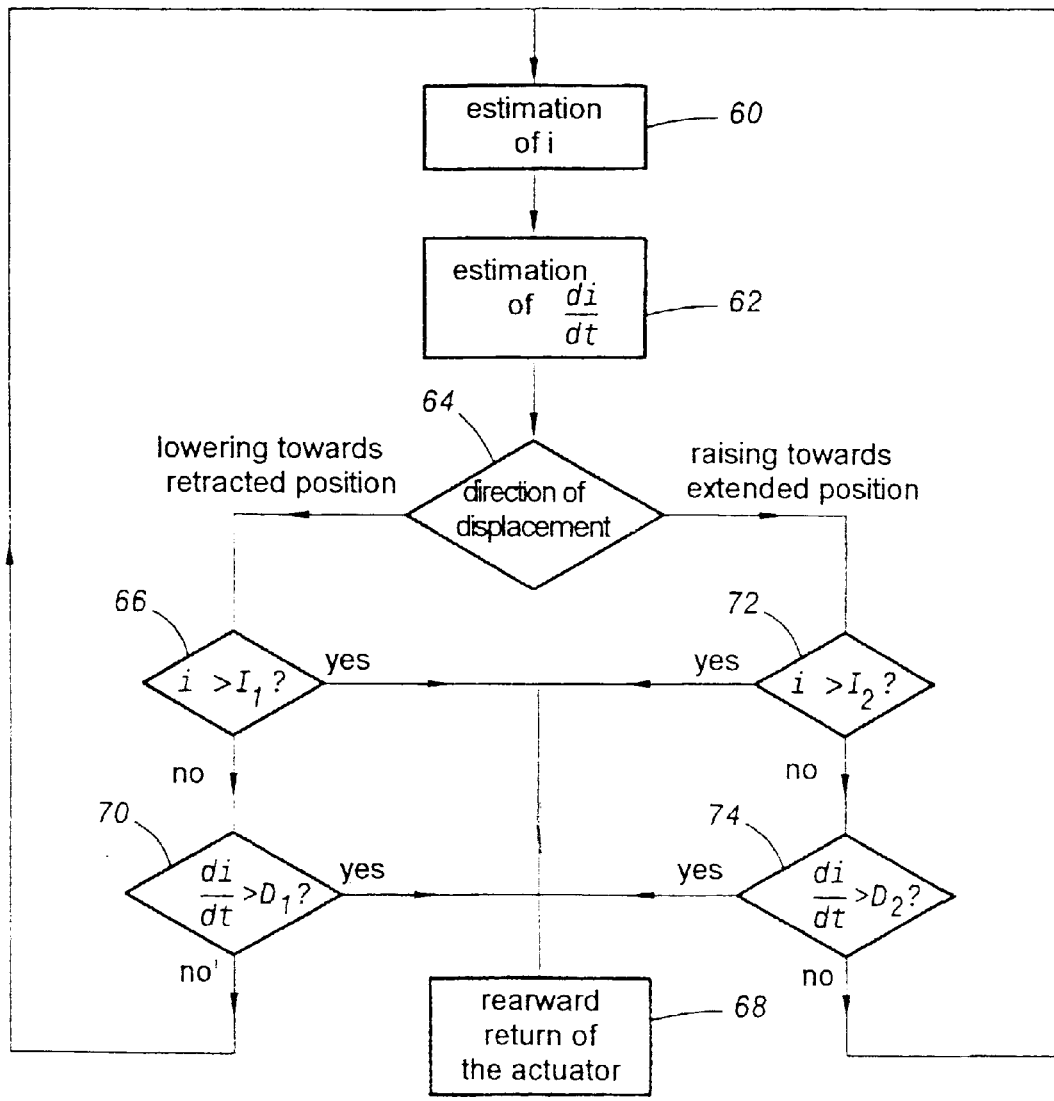
FIG. 2 is a flow chart of the algorithm used in the central unit for managing the operation of the seat of FIG. 1.

Moreover, while the actuator 24 is in operation, the central information processing unit 40 employs continuously a routine, the algorithm of which is illustrated in FIG. 2. The successive steps of this algorithm are looped.

The algorithm comprises, first, a step 60 for estimating the intensity i of the current consumed by the actuator 24. The intensity i is provided by the tracking means 42.

In the next step 62, the central information processing unit 40 gathers an estimation of the derivative with respect to time $$\frac{di}{dt}$$

of the intensity of the current consumed. This estimation is provided by the derivation means 44.

In the next step, designated 64, the central information processing unit 40 determines the direction of displacement of the actuator 24 on the basis of the information received from the keypad 32.

Depending on whether the leg-rest 20 is brought towards its retracted position or its extended position, the steps of one or other of the branches of the flow chart are implemented.

More specifically, if the direction of displacement is such that the leg-rest is brought towards its retracted position, the intensity i is first compared, in step 66, with a first predetermined threshold value $I_1$ stored in the means 46.

This first threshold value $I_1$ is set experimentally and corresponds to a minimum value of current consumed by the actuator 24 when the leg-rest or the footrest prolonging the latter strikes an obstacle while it is returning towards its retracted position, the legs of a passenger seated on the seat bearing on the upper surface of the leg-rest. The first threshold value $I_1$ is set at a relatively low level.

If the value of the intensity i of the current, provided by the tracking means 42, is higher than the first threshold value $I_1$, a rearward return of the actuator over a small travel is commanded, in step 68, by the central information processing unit 40 controlling the interface 36 in this direction. The rearward return is carried out, for example, during a brief predetermined period of time in the course of which the motor of the actuator is set in rotation in the opposite direction.

Alternatively, the rearward return is carried out over a brief predetermined travel of the actuator. In this case, the actuator must be equipped with means for the continuous measurement of its position, such as a potentiometer.

If, on the contrary, the intensity i is lower than the threshold value $I_1$, the test step 70 is then implemented. During this step, the value $$\frac{di}{dt}$$

of the derivative with respect to time of the intensity i of the current consumed by the actuator 24 is compared with a first threshold value $D_1$ stored in the storage means 46.

The first threshold value $D_1$ corresponds to the minimum value of the derivative with respect to time of the intensity of the current consumed by the actuator 24 when the leg-rest 20 encounters an obstacle while it is being brought towards its retracted position, the legs of a user bearing on the upper surface of the leg-rest 20. The threshold value $D_1$ is set at a relatively low level.

If the estimated value of the derivative with respect to time $$\frac{di}{dt}$$

of the intensity i of the current consumed is higher than the first threshold value $D_1$, a brief rearward return of the actuator 24 is commanded by means of step 68. On the contrary, if this condition is not satisfied, the actuator is not stopped and step 60 is implemented again.

If the direction of displacement, detected during the test conducted in step 64, causes the leg-rest to rise towards its extended position, the estimated current i is compared, in step 72, with a second threshold value $I_2$ stored in the storage means 48.

This second threshold value $I_2$ is higher than the first threshold value $I_1$. It is set experimentally and corresponds to the minimum value of the intensity of the current consumed by the actuator 24 when the leg-rest is returned towards its extended position, while it is supporting the legs of the user of the seat, and when it encounters an obstacle impeding the free travel of the leg-rest.

In step 72, if the estimated value i is higher than the second threshold value $I_2$, a brief rearward return of the actuator 24 is commanded in step 68. By contrast, if this condition is not satisfied, the value $$\frac{di}{dt}$$

of the derivative with respect to time of the intensity of the current consumed by the actuator 24 is compared, in step 74, with a second predetermined threshold value $D_2$.

This second predetermined threshold value $D_2$ is determined experimentally. It corresponds to the minimum value of the derivative with respect to time of the intensity of the current consumed by the actuator 24 when the leg-rest is returned towards its extended position and encounters an obstacle. This second threshold value is higher than the first threshold value $D_1$.

If the value $$\frac{di}{dt}$$

is higher than the second threshold value $D_2$, a brief rearward return of the actuator 24 is commanded in step 68. If this is not so, step 60 is implemented again.

It will be appreciated that, depending on the direction of displacement of the actuator 24, the value of the intensity i of the current consumed and its first derivative with respect to time $$\frac{di}{dt}$$

are compared with predetermined thresholds, the values of which depend on the direction of displacement of the leg-rest.

If the intensity or its first derivative happens to exceed one of these threshold values, the brief rearward return of the actuator is commanded, thus preventing the leg-rest from continuing its displacement, which could injure the passenger, damage a luggage item or else harm the seat itself.

However, in as much as the weight of the passenger's legs which is applied to the leg-rest 20 has opposite effects, depending on whether the leg-rest is lowered towards its retracted position or raised towards its extended position, the values of the predetermined thresholds are different.

To be precise, during the lowering of the leg-rest, the weight of the user's legs contributes to the displacement of the leg-rest, so that the current consumed by the actuator 24 is usually low. Thus, the threshold $I_1$ can be set at a low value, making it possible to stop the actuator as soon as the intensity of the current consumed by the actuator 24 experiences a slight increase.

On the contrary, when the leg-rest is raised and is displaced towards its extended position, the intensity of the current consumed by the actuator is usually high, since the actuator must then overcome the effect of the weight of the seat user's legs. Thus, the intensity of the current consumed being compared with the second threshold value $I_2$, the stopping of the actuator is commanded only when the intensity of the current exceeds the second threshold value $I_2$. Thus, the threshold value $I_2$ can be set at a sufficiently high value so that, even with a passenger having very heavy legs, the stopping of the actuator does not occur undesirably.

Establishing the threshold $I_2$ at a high value does not prevent the use of a very low stopping threshold during the displacement of the leg-rest towards its retracted position, thereby considerably increasing the degree of safety when the seat is in operation. To be precise, the risks of the leg-rest striking an obstacle are greater when the leg-rest is displaced towards its retracted position than towards its extended position. In fact, when the leg-rest is lowered, the obstacles which it may encounter are outside the user's field of vision.

Thus, the use of separate thresholds, depending on the direction of displacement of the leg-rest, makes it possible to refine the method for managing the operation of the seat, thus preventing inopportune stops of the actuator, as may be seen when a single threshold is employed.

Likewise, the thresholds, in comparison with the derivative with respect to time of the intensity of the current consumed by the actuator, may also be set in a differentiated manner, depending on the direction of displacement of the leg-rest.

It will be appreciated that such a monitoring method may also be adopted for actuators controlling the displacement of other parts of the seat, in particular for an actuator controlling the articulated back of the seat.

In the embodiment described here, the intensity and its first derivative with respect to time are compared with separate threshold values as a function of the direction of displacement of the actuator. However, in general terms, any type of variable characteristic of the force generated by the actuators during use may be employed. Thus, the above-described variables characteristic of the current consumed, which represent the force exerted by the actuator, may be replaced by the torque exerted by an actuator or by the power delivered by the latter. In particular, the tracking means described may be replaced by torque sensors, the comparisons made then being applied to the measured torques.

Furthermore, according to another variant, when one of the predetermined thresholds is crossed, instead of the actuator being controlled in the opposite direction, as described here, the actuator is simply stopped.

What is claimed is:

1. A method for controlling the operation of a seat equipped with at least one actuator comprising means for tracking at least one variable characteristic of the force generated by the actuator and means for controlling the actuator movement in first and second directions, the method comprising the steps of:

measuring the at least one characteristic variable;

evaluating the at least one characteristic variable on the basis of at least one predetermined evaluation criterion; and controlling the operation of the seat as a function of the result of said evaluating step;

said evaluation step comprising:

applying a first evaluation criterion of the at least one characteristic variable measured when the actuator movement is controlled in the first direction; and applying a second evaluation criterion of the at least one characteristic variable measured when the actuator movement is controlled in the second direction, the second evaluation criterion being different from the first evaluation criterion.

2. A method for controlling the operation of a seat according to claim 1, wherein the step of controlling the operation of the seat comprises providing actuator movement in a direction opposite to the direction of actuator movement being controlled when the at least one characteristic variable is measured.

3. A method for controlling the operation of a seat according to claim 2, wherein the at least one variable characteristic of the force generated by said actuator comprises a variable characteristic of the electrical current consumed by this actuator.

4. A method for controlling the operation of a seat according to claim 3, wherein said characteristic variable comprises the intensity of the current consumed by the actuator, and wherein the first an second predetermined evaluation criteria comprise comparisons of the intensity of the current consumed with separate predetermined thresholds.

5. A method for controlling the operation of a seat according to claim 3, wherein said characteristic variable comprises the derivative with respect to time of the intensity of the current consumed by the actuator, and wherein the first and second predetermined evaluation criteria comprise comparisons of the derivative with respect to time of the intensity of the current consumed with separate predetermined thresholds.

* * * * *